(12) United States Patent
Takenaka

(10) Patent No.: US 10,707,754 B2
(45) Date of Patent: Jul. 7, 2020

(54) SWITCHING POWER SUPPLY CIRCUIT, LIQUID CRYSTAL DRIVING DEVICE, AND LIQUID CRYSTAL DISPLAY DEVICE

(71) Applicant: Rohm Co., Ltd., Kyoto (JP)

(72) Inventor: Seiji Takenaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 301 days.

(21) Appl. No.: 15/162,879

(22) Filed: May 24, 2016

(65) Prior Publication Data

US 2016/0351146 A1 Dec. 1, 2016

(30) Foreign Application Priority Data

May 25, 2015 (JP) .................................. 2015-105617
May 28, 2015 (JP) .................................. 2015-108885
Apr. 12, 2016 (JP) .................................. 2016-079385

(51) Int. Cl.
*H02M 3/157* (2006.01)
*H02M 3/156* (2006.01)

(52) U.S. Cl.
CPC ........... *H02M 3/157* (2013.01); *H02M 3/156* (2013.01); *H02M 2003/1566* (2013.01)

(58) Field of Classification Search
None
See application file for complete search history.

(56) References Cited

U.S. PATENT DOCUMENTS

| 2011/0133711 | A1* | 6/2011 | Murakami | ......... H03K 17/0822 323/282 |
| 2012/0049829 | A1* | 3/2012 | Murakami | ............. H02M 1/32 323/288 |
| 2014/0146426 | A1* | 5/2014 | Murakami | |
| 2015/0205313 | A1* | 7/2015 | Tomioka | .................. G05F 1/56 332/280 |

FOREIGN PATENT DOCUMENTS

JP 05-219650 8/1993

\* cited by examiner

*Primary Examiner* — Andre L Matthews
(74) *Attorney, Agent, or Firm* — Fish & Richardson P.C.

(57) ABSTRACT

A switching power supply circuit includes a switching output unit that generates an output voltage from an input voltage using an output transistor, a switching control unit that controls on and off of the output transistor so that the output voltage or a feedback voltage in proportion to the output voltage agrees with a predetermined reference voltage, and one of an interrupt unit and a reference voltage setting unit. The interrupt unit forcibly turns off the output transistor during a period while the output voltage or the feedback voltage is higher than a threshold value voltage that is higher than the reference voltage in response to a periodic load change. The reference voltage setting unit temporarily changes the reference voltage in synchronization with timing of a periodic load change.

6 Claims, 12 Drawing Sheets

SWITCHING POWER SUPPLY CIRCUIT, LIQUID CRYSTAL DRIVING DEVICE, AND LIQUID CRYSTAL DISPLAY DEVICE

CROSS-REFERENCE TO RELATED APPLICATIONS

This application claims priority based on Japanese Patent Applications No. 2015-105617, No. 2015-108885, and No. 2016-079385 filed on May 25, 2015, May 28, 2015, and Apr. 12, 2016, respectively, the contents of which are hereby incorporated by reference.

BACKGROUND OF THE INVENTION

Field of the Invention

The present invention relates to a switching power supply circuit, a liquid crystal driving device, and a liquid crystal display device.

Description of Related Art

Conventionally, switching power supply circuits are generally and widely used as power supply means of various applications.

An example of conventional techniques related to the above description is disclosed in JP-A-05-219650.

However, there is room for further improvement in the conventional switching power supply circuit concerning responsiveness to a periodic load change.

SUMMARY OF THE INVENTION

In view of the above-mentioned problem found by the inventor, it is an object of the invention disclosed in this specification to provide a switching power supply circuit having high responsiveness to a periodic load change, and a liquid crystal driving device and a liquid crystal display device using the switching power supply circuit.

The switching power supply circuit disclosed in this specification includes a switching output unit arranged to generate an output voltage from an input voltage using an output transistor, a switching control unit arranged to control on and off of the output transistor so that the output voltage or a feedback voltage in proportion to the output voltage agrees with a predetermined reference voltage, and one of an interrupt unit and a reference voltage setting unit. The interrupt unit forcibly turns off the output transistor during a period while the output voltage or the feedback voltage is higher than a threshold value voltage that is higher than the reference voltage in response to a periodic load change. The reference voltage setting unit temporarily changes the reference voltage in synchronization with timing of a periodic load change.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

<Liquid Crystal Display Device>

Figure 1:
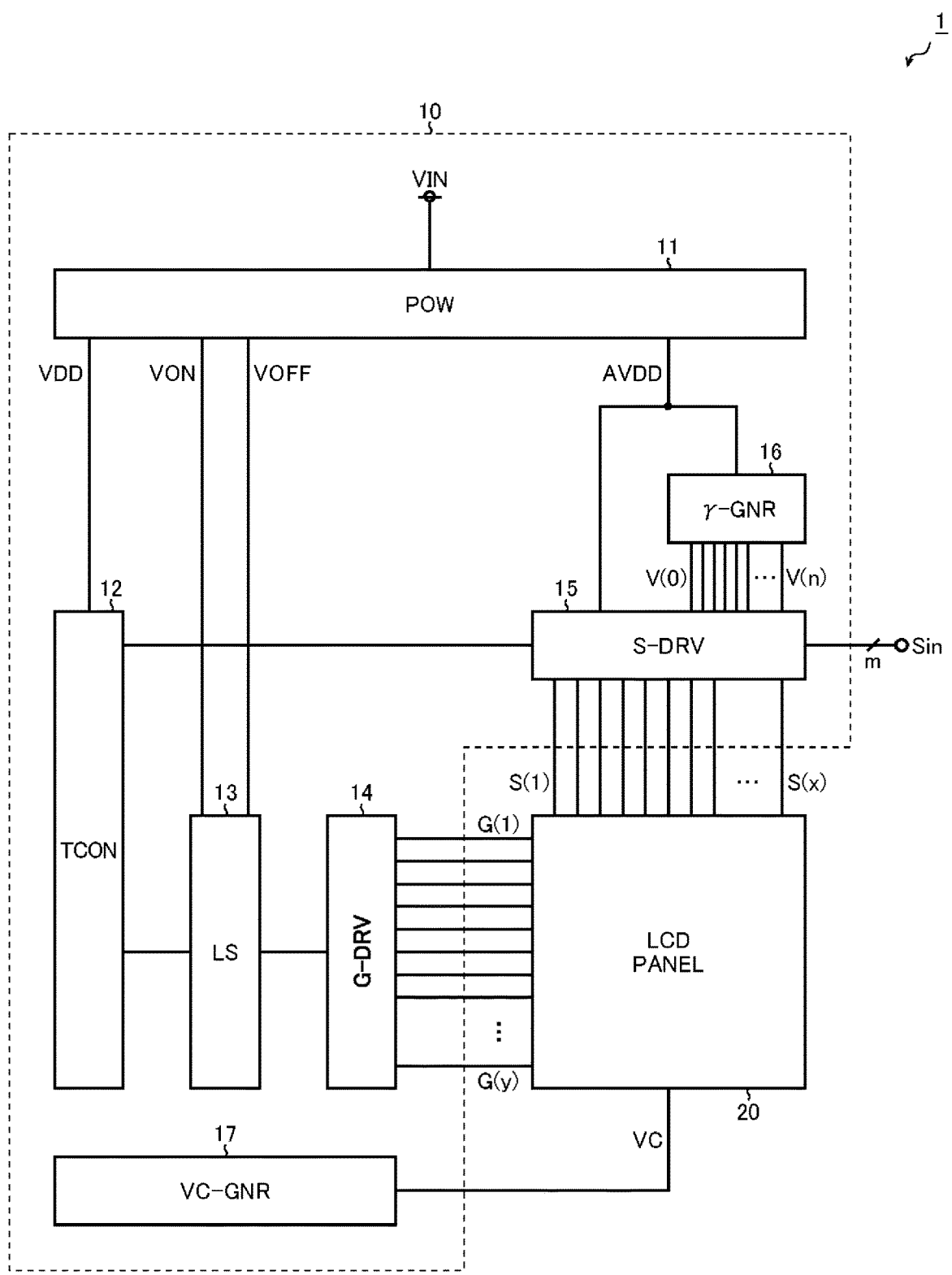
FIG. 1 is a block diagram illustrating a structural example of a liquid crystal display device.

FIG. 1 is a block diagram illustrating a structural example of a liquid crystal display device. A liquid crystal display device 1 of this structural example includes a liquid crystal driving device 10 and a liquid crystal display panel 20. The liquid crystal driving device 10 drives and controls the liquid crystal display panel 20 on the basis of an image signal Sin and various commands input from a host device (such as a microcomputer, not shown). The liquid crystal display panel 20 is image output means using liquid crystal elements as pixels.

<Liquid Crystal Driving Device>

Next, the liquid crystal driving device 10 is described in detail with reference to FIG. 1. The liquid crystal driving device 10 of this structural example includes a system power supply unit 11, a timing control unit 12, a level shifter 13, a gate driver 14, a source driver 15, a gamma voltage generating unit 16, and a common voltage generating unit 17.

The system power supply unit 11 operates on power supplied from an input voltage VIN (e.g., +12 V) and generates an analog power supply voltage AVDD (e.g., +17 V), a logic power supply voltage VDD (e.g., +3.3 V, +1.8 V, and +1.2 V), a positive power supply voltage VON (e.g., +28 V), and a negative power supply voltage VOFF (e.g., −12 V), so as to supply the voltages to the individual units of the device.

The timing control unit 12 operates on power supplied from the logic power supply voltage VDD and performs timing control of the liquid crystal driving device 10 (such as vertical synchronization control of the gate driver 14 and horizontal synchronization control of the source driver 15), on the basis of commands and data input from the host device.

The level shifter 13 operates on power supplied from the positive power supply voltage VON and the negative power supply voltage VOFF, so as to shift a level of the timing control signal (the vertical synchronization signal) input from the timing control unit 12 and to send the result to the gate driver 14.

The gate driver 14 generates gate signals G(1) to G(y) of the liquid crystal display panel 20 on the basis of the vertical synchronization signal input from the level shifter 13, and supplies the gate signals to the liquid crystal elements of the liquid crystal display panel 20 (to gate terminals of active elements connected respectively to the liquid crystal elements if the liquid crystal display panel 20 is an active matrix type).

The source driver 15 operates on power supplied from the analog power supply voltage AVDD so as to convert a (m-bit) digital image signal Sin input from the host device (not shown) into analog source signals S(1) to S(x), and supplies the source signals to the liquid crystal elements of the liquid crystal display panel 20 (to source terminals of the active elements connected respectively to the liquid crystal elements if the liquid crystal display panel 20 is an active matrix type).

The gamma voltage generating unit 16 operates on power supplied from the analog power supply voltage AVDD so as to generate gradation voltages V(0) to V(n) having $2^m$ gradation steps (n=$2^m$-1), and supplies the gradation voltages to the source driver 15. Note that the gradation voltages V(0) to V(n) correspond respectively to data values 0 to n of the image signal Sin one to one.

The common voltage generating unit 17 generates a predetermined common voltage VC and supplies the common voltage to the liquid crystal elements of the liquid crystal display panel 20 (to drain terminals of the active elements connected respectively to the liquid crystal elements if the liquid crystal display panel 20 is an active matrix type).

Switching Power Supply Circuit (First Embodiment)

Figure 2:
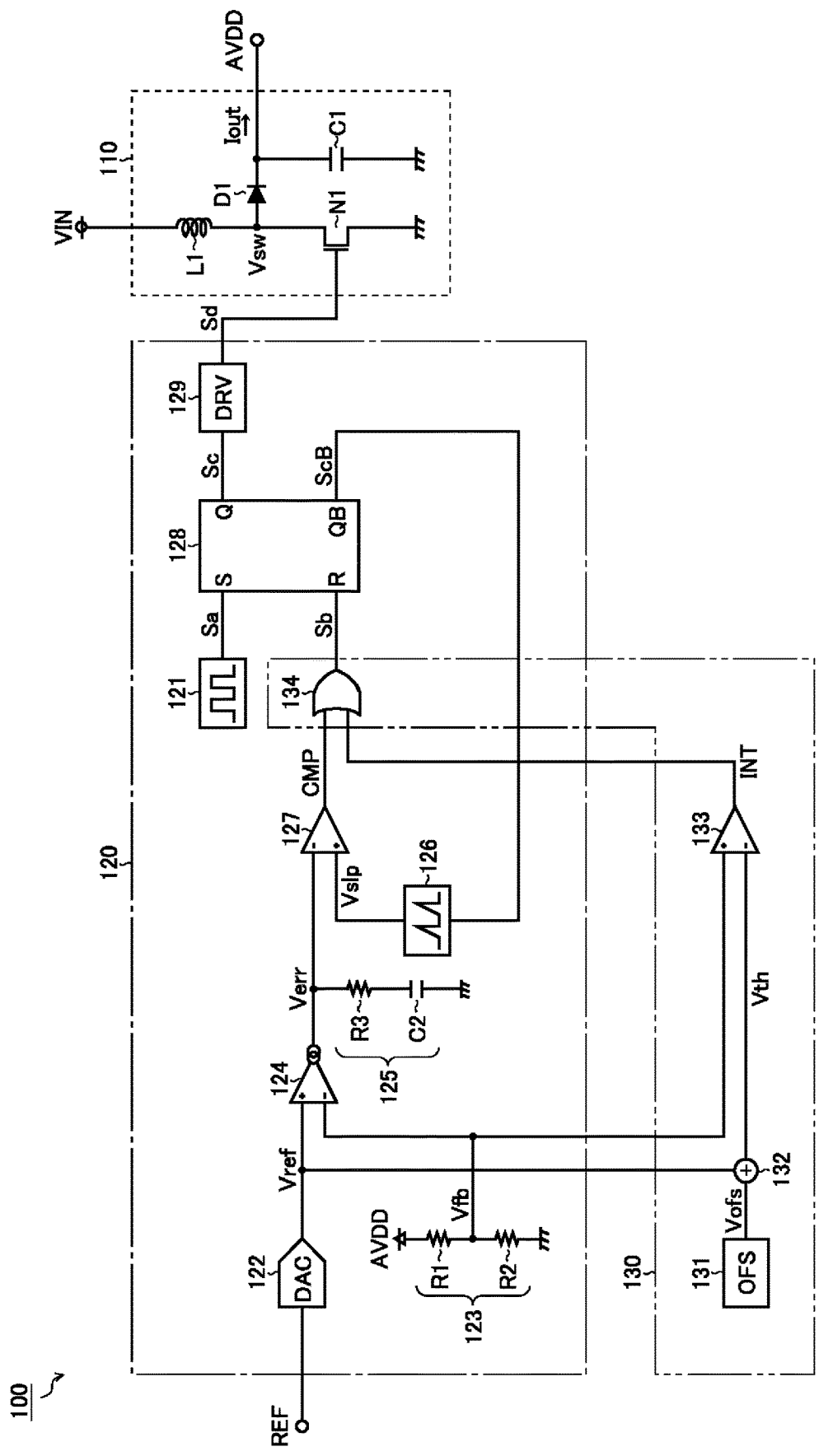
FIG. 2 is a circuit diagram illustrating a first embodiment of a switching power supply circuit.

FIG. 2 is a circuit diagram illustrating a first embodiment of a switching power supply circuit incorporated in the system power supply unit 11. A switching power supply circuit 100 of this embodiment is a circuit unit that generates the desired analog power supply voltage AVDD (corresponding to the output voltage) from the input voltage VIN, and includes a switching output unit 110, a switching control unit 120, and an interrupt unit 130.

The switching output unit 110 is a step-up type switching output stage that generates the analog power supply voltage AVDD from the input voltage VIN, and includes an output transistor N1 (an N-channel metal oxide semiconductor (MOS) field-effect transistor in the example of this diagram), a coil L1, a diode D1, and a capacitor C1.

A first terminal of the coil L1 is connected to an application terminal of the input voltage VIN. A second terminal of the coil L1 is connected to a drain of the output transistor N1 and an anode of the diode D1. A source of the output transistor N1 is connected to a ground terminal. A gate of the output transistor N1 is connected to an output terminal of the switching control unit 120 (i.e., an output terminal of a gate signal Sd). A cathode of the diode D1 is connected to an output terminal of the analog power supply voltage AVDD and a first terminal of the capacitor C1. A second terminal of the capacitor C1 is connected to the ground terminal.

The switching control unit 120 is an output feedback circuit unit that controls on and off of the output transistor N1 so that a feedback voltage Vfb in proportion to the analog power supply voltage AVDD agrees with a predetermined reference voltage Vref, and includes a clock signal generating unit 121, a digital-to-analog conversion unit 122, a feedback voltage generating unit 123, an error amplifier 124, a phase compensator 125, a slope voltage generating unit 126, a comparator 127, an RS flip-flop 128, and a driver 129.

The clock signal generating unit 121 generates a clock signal at a predetermined switching frequency f (=1/T) and outputs the clock signal as a set signal Sa to the RS flip-flop 128.

The digital-to-analog conversion unit 122 generates the analog reference voltage Vref from a digital reference voltage setting signal REF.

The feedback voltage generating unit 123 includes resistors R1 and R2 connected in series between an application terminal of the analog power supply voltage AVDD and the ground terminal, and outputs a feedback voltage Vfb (={R2/(R1+R2)}×AVDD) obtained by dividing the analog power supply voltage AVDD at a connection node between the resistor R1 and the resistor R2. However, if the analog power supply voltage AVDD is within the input dynamic ranges of the switching control unit 120 and the interrupt unit 130, the feedback voltage generating unit 123 may be eliminated so as to directly receive the analog power supply voltage AVDD as the feedback voltage Vfb.

The error amplifier 124 is a DC output type transconductance amplifier (so-called gm amplifier). The error amplifier 124 charges and discharges a capacitor C2 that constitutes the phase compensator 125 in response to a differential value between the feedback voltage Vfb input to an inverting input terminal (−) and a reference voltage Vref input to a non-inverting input terminal (+), so as to generate an error voltage Verr. Further, if the feedback voltage Vfb is lower than the reference voltage Vref, current flows from the error amplifier 124 to the capacitor C2 so that the error voltage Verr is increased. On the contrary, if the feedback voltage Vfb is higher than the reference voltage Vref, current flows from the capacitor C2 to the error amplifier 124 so that the error voltage Verr is decreased.

The phase compensator 125 is a time constant circuit including a resistor R3 and the capacitor C2 connected in series between the output terminal of the error amplifier 124 and the ground terminal, and performs phase compensation of the error voltage Verr.

The slope voltage generating unit 126 generates a slope voltage Vslp in synchronization with on/off control of the output transistor N1 (an inverted pulse width modulation signal ScB in the example of this diagram). The slope voltage Vslp is an analog voltage having a sawtooth waveform that starts to increase at an on-timing of the output transistor N1 and is reset to zero at an off-timing of the output transistor N1.

The comparator 127 compares the error voltage Verr input to the inverting input terminal (−) with the slope voltage Vslp input to the non-inverting input terminal (+) so as to generate a comparison signal CMP. The comparison signal CMP becomes a low level if the error voltage Verr is higher than the slope voltage Vslp, while it becomes a high level if the error voltage Verr is lower than the slope voltage Vslp.

The RS flip-flop 128 outputs a pulse width modulation signal Sc from an output terminal (Q) in response to a set signal Sa input to a set terminal (S) and a reset signal Sb input to a reset terminal (R). The pulse width modulation signal Sc is set to the high level at a rising edge of the set signal Sa and is reset to the low level at a rising edge of the reset signal Sb. However, the reset signal Sb is prioritized if the set signal Sa and the reset signal Sb become the high level at the same time. Note that the RS flip-flop 128 simultaneously outputs the inverted pulse width modulation signal ScB (i.e., a logically inverted signal of the pulse width modulation signal Sc) from an inverting output terminal (QB).

The driver 129 receives an input of the pulse width modulation signal Sc and intensifies the current flow ability so as to generate the gate signal Sd of the output transistor N1 (corresponding to an on/off control signal of the output transistor N1), and outputs the gate signal to the gate of the output transistor N1. The output transistor N1 is turned on when the gate signal Sd is at the high level, while it is turned off when the gate signal Sd is at the low level.

The interrupt unit 130 is a circuit unit that performs interrupt control for forcibly turning off the output transistor N1 during a period while the feedback voltage Vfb is higher than a threshold value voltage Vth that is higher than the reference voltage Vref in response to a periodic load change, and includes an offset voltage generating unit 131, an adder unit 132, a comparator 133, and an OR gate 134.

The offset voltage generating unit 131 generates a predetermined offset voltage Vofs. Note that it is preferred to set the offset voltage Vofs to approximately 1% of the reference voltage Vref (=Vref×0.01).

The adder unit 132 adds the offset voltage Vofs to the reference voltage Vref so as to generate the threshold value voltage Vth (=Vref+Vofs). In other words, the threshold value voltage Vth is set in a variable manner on the basis of the reference voltage Vref.

Note that it is possible to configure to multiply the reference voltage Vref by a predetermined offset coefficient α (e.g., 1.01) so as to generate the threshold value voltage Vth instead of adding the offset voltage Vofs to the reference voltage Vref.

The comparator 133 compares the feedback voltage Vfb input to the non-inverting input terminal (+) and the threshold value voltage Vth input to the inverting input terminal (−) so as to generate an interrupt signal INT. The interrupt signal INT becomes the high level if the feedback voltage Vfb is higher than the threshold value voltage Vth, and it becomes the low level if the feedback voltage Vfb is lower than the threshold value voltage Vth on the contrary.

The OR gate 134 performs a logical OR operation between the comparison signal CMP and the interrupt signal INT, so as to output a result of the operation as the reset signal Sb. Accordingly, if the interrupt signal INT is at the low level, the comparison signal CMP is output as the reset signal Sb. On the other hand, if the interrupt signal INT is at the high level, the reset signal Sb is fixed at the high level regardless of a logical level of the comparison signal CMP.

During a period while the reset signal Sb is fixed at the high level, even if a pulse occurs in the set signal Sa, the pulse width modulation signal Sc is still reset to the low level, and hence the output transistor N1 is still turned off. In this way, the interrupt unit 130 has an interrupt function for forcibly turning off the output transistor N1 by using the interrupt signal INT, and the technical meaning thereof will be described later in detail.

<Basic Operation (Step-Up Operation)>

First, a basic operation (step-up operation) of the switching power supply circuit 100 is described. When the output transistor N1 is turned on, switching current to the ground terminal flows in the coil L1 via the output transistor N1 so that the coil L1 stores the electric energy. In this case, a switch voltage Vsw that appears at the anode of the diode D1 drops to substantially the ground voltage via the output transistor N1. Accordingly, the diode D1 becomes a reverse biased state so that current does not flow from the capacitor C1 to the output transistor N1.

On the other hand, when the output transistor N1 is turned off, a counter electromotive force is generated in the coil L1 so that the stored electric energy is discharged as current. In this case, the diode D1 becomes a forward bias state, and hence current flowing via the diode D1 flows as an output current Iout from the output terminal of the analog power supply voltage AVDD to loads (the source driver 15 and the gamma voltage generating unit 16), and also flows through the capacitor C1 to the ground terminal so that the capacitor C1 is charged. The operation described above is repeated, and hence the loads are supplied with the analog power supply voltage AVDD that is stepped up from the input voltage VIN.

<Slope Voltage Generating Unit>

Figure 3:
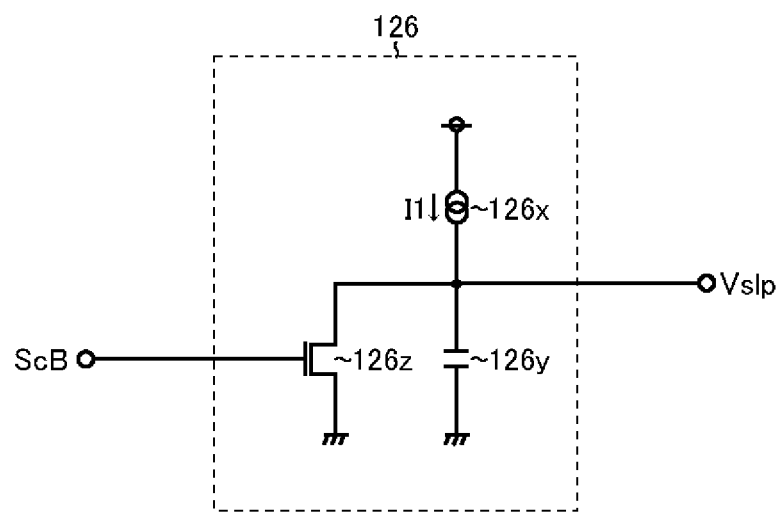
FIG. 3 is a circuit diagram illustrating a structural example of a slope voltage generating unit.

FIG. 3 is a circuit diagram illustrating a structural example of the slope voltage generating unit 126. The slope voltage generating unit 126 of this structural example includes a current source 126*x*, a capacitor 126*y*, and an N-channel MOS field-effect transistor 126*z*.

The current source 126*x* is connected between a power supply terminal and a first terminal of the capacitor 126*y* (i.e., an output terminal of the slope voltage Vslp), and generates a predetermined charging current I1.

The first terminal of the capacitor 126*y* is connected to the output terminal of the slope voltage Vslp. A second terminal of the capacitor 126*y* is connected to the ground terminal. When the transistor 126*z* is turned off, the capacitor 126*y* is charged by the charging current I1, and hence the slope voltage Vslp at the first terminal of the capacitor 126*y* is gradually increased. On the other hand, when the transistor 126*z* is turned on, the capacitor 126*y* is discharged via the transistor 126*z*, and hence the slope voltage Vslp is reset to zero.

The transistor 126*z* is a charge and discharge switch that switches to charge and discharge the capacitor 126*y* in response to on/off control of the output transistor N1. A drain of the transistor 126*z* is connected to the first terminal of the capacitor 126*y*. A source of the transistor 126*z* is connected to the ground terminal. A gate of the transistor 126*z* is connected to an application terminal of the inverted pulse width modulation signal ScB. Accordingly, the transistor 126*z* is turned on when the inverted pulse width modulation signal ScB is at the high level, while it is turned off when the inverted pulse width modulation signal ScB is at the low level.

<Duty Control>

Figure 4:
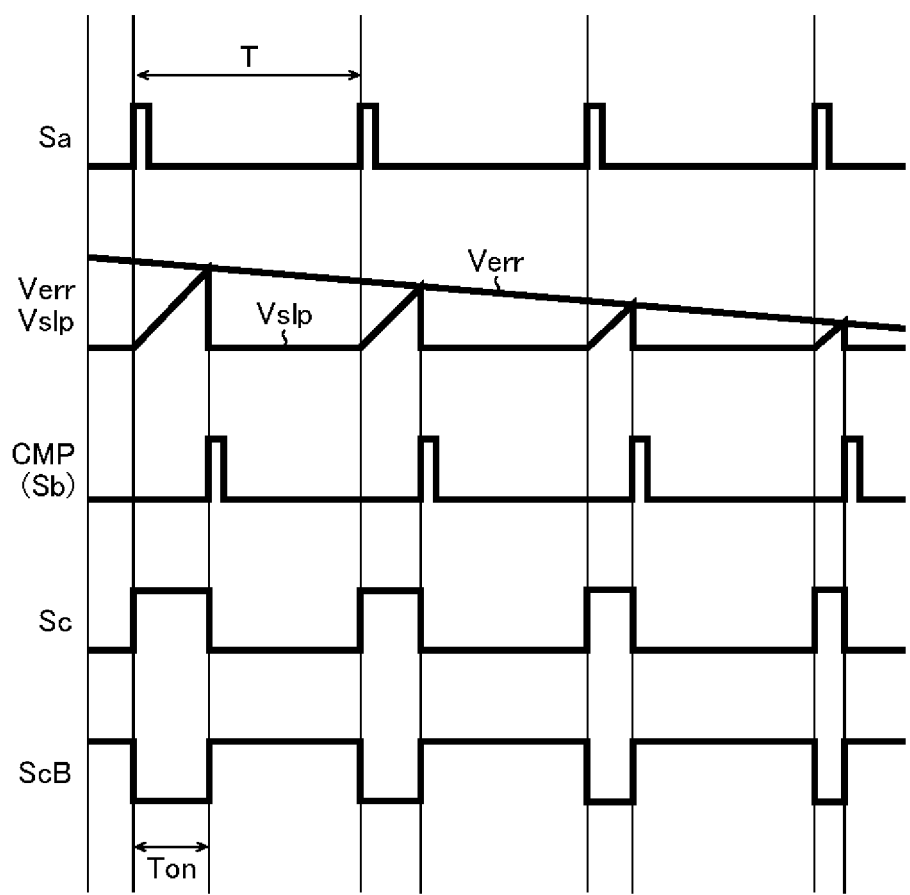
FIG. 4 is a timing chart illustrating an example of duty control.

FIG. 4 is a timing chart illustrating an example of the duty control in response to the error voltage Verr, and shows the set signal Sa, the error voltage Verr and the slope voltage Vslp, the comparison signal CMP (that is equivalent to the reset signal Sb when the interrupt signal INT is at the low level), the pulse width modulation signal Sc, and the inverted pulse width modulation signal ScB, in order from top to bottom.

When the set signal Sa rises to the high level, the pulse width modulation signal Sc is set to the high level, and hence the output transistor N1 it turned on. In this case, the transistor 126*z* is turned off when the inverted pulse width modulation signal ScB becomes the low level, and hence charging of the capacitor 126*y* by the charging current I1 is started. Accordingly, the slope voltage Vslp starts to increase at a predetermined gradient.

After that, when the slope voltage Vslp becomes higher than the error voltage Verr, the comparison signal CMP rises to the high level while the pulse width modulation signal Sc is reset to the low level, and hence the output transistor N1 is turned off. In this case, the transistor 126*z* is turned on when the inverted pulse width modulation signal ScB becomes the high level. As a result, the capacitor 126*y* is quickly discharged via the transistor 126*z*, and the slope voltage Vslp is reset to zero.

Note that cross timing between the error voltage Verr and the slope voltage Vslp is delayed more as the error voltage Verr is higher. Accordingly, a high level period of the pulse width modulation signal Sc (i.e., an on period Ton of the output transistor N1) becomes longer, and hence an on duty Don of the output transistor N1 (i.e., a ratio of the on period Ton to the switching period T, Don=Ton/T) becomes larger.

On the contrary, as the error voltage Verr is lower, the cross timing between the error voltage Verr and the slope voltage Vslp becomes earlier. Accordingly, the high level period of the pulse width modulation signal Sc becomes shorter, and hence the on duty Don of the output transistor N1 becomes smaller.

In this way, in the switching power supply circuit 100, the on duty Don of the output transistor N1 is determined in response to the error voltage Verr, and hence the desired analog power supply voltage AVDD is generated from the input voltage VIN.

Load Response Behavior (First Embodiment)

Figure 5:
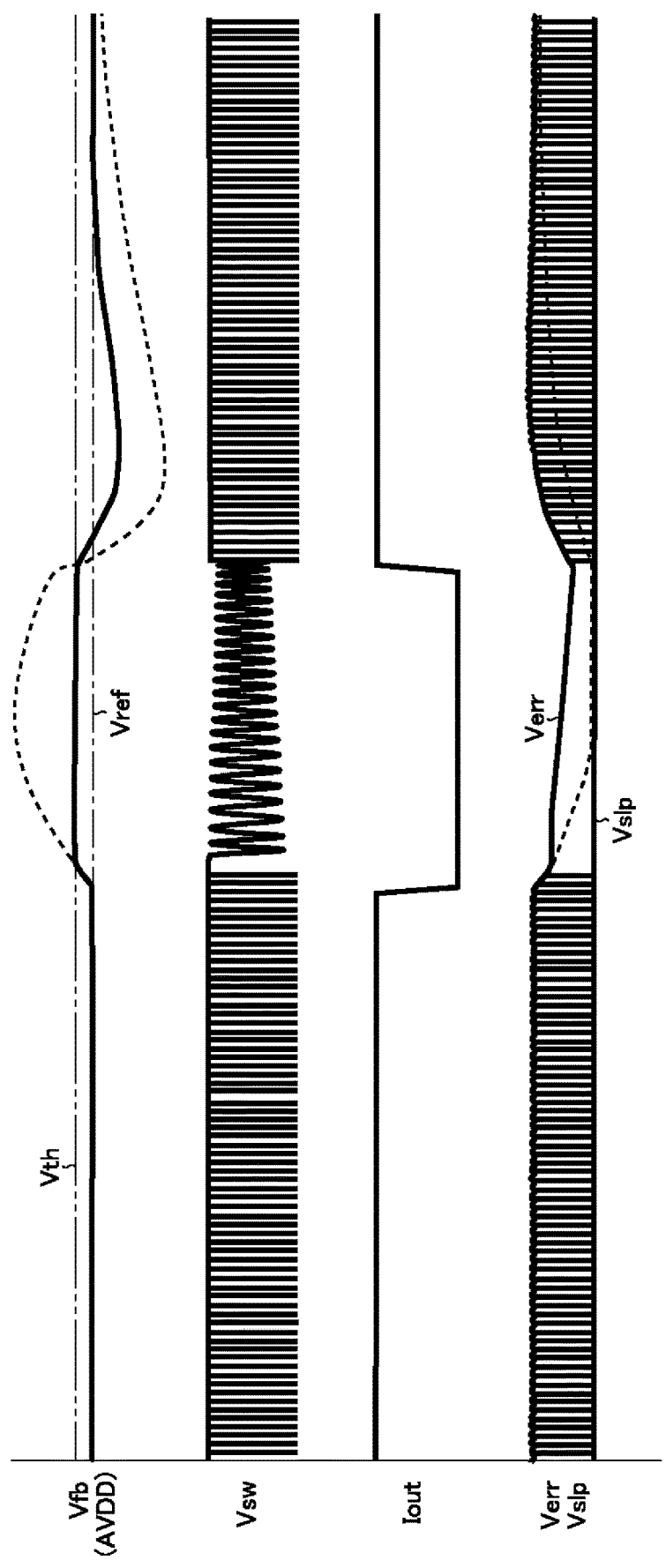
FIG. 5 is a timing chart illustrating an example of load response behavior in the first embodiment.

FIG. 5 is a timing chart illustrating an example of load response behavior in the first embodiment, and shows the feedback voltage Vfb (therefore the analog power supply voltage AVDD), the switch voltage Vsw, the output current Iout, and the error voltage Verr and the slope voltage Vslp, in order from top to bottom.

Further, as to the feedback voltage Vfb and the error voltage Verr, solid lines indicate behaviors when the interrupt unit 130 is mounted (load response behaviors in the first embodiment), while broken lines indicate behaviors when the interrupt unit 130 is not mounted (conventional load response behaviors) for comparison.

As to the source driver 15 and the gamma voltage generating unit 16 that are loads on the switching power supply circuit 100, consumption currents thereof are periodically changed because the liquid crystal display panel 20 alternately repeats display periods and non-display periods (so-called blanking periods).

In other words, the output current Iout of the switching power supply circuit 100 is periodically changed in response to a driving state of the liquid crystal display panel 20. Specifically, a predetermined output current Iout flows in the display period of the liquid crystal display panel 20 (a heavy load state). On the other hand, the output current Iout does not substantially flow in the non-display period of the liquid crystal display panel 20 (a light load state).

When the liquid crystal display panel 20 changes from the display period to the non-display period so that the output current Iout is rapidly changes from the heavy load state to the light load state, the analog power supply voltage AVDD is raised from a set value, and hence the feedback voltage Vfb is raised from the reference voltage Vref.

If the interrupt unit 130 is not mounted, the on/off operation of the output transistor N1 is not stopped under this circumstance too, and hence negative feedback control is performed so that the feedback voltage Vfb agrees with the reference voltage Vref. Accordingly, the error voltage Verr is largely decreased from the balanced value (i.e., a voltage value of the error voltage Verr when the feedback voltage Vfb agrees with the reference voltage Vref).

Here, when the liquid crystal display panel 20 changes from the non-display period to the display period again so that the output current Iout rapidly changes from the light load state to the heavy load state again, it takes time to return the largely decreased error voltage Verr to the balanced value. As a result, the on duty Don of the output transistor N1 cannot be sufficiently increased, and hence the analog power supply voltage AVDD is largely decreased from the set value. Thus, display operation of the liquid crystal display panel 20 may be disturbed.

On the other hand, if the interrupt unit 130 is mounted, when the feedback voltage Vfb becomes higher than the threshold value voltage Vth, the output transistor N1 is forcibly turned off. As a result, the feedback voltage Vfb increases only to the threshold value voltage Vth, and hence the error voltage Verr is not largely decreased from the balanced value.

Accordingly, even if the liquid crystal display panel 20 is changed from the non-display period to the display period again so that the output current Iout is rapidly changed from the light load state to the heavy load state again, it is possible to return the error voltage Verr to the balanced value without delay. As a result, the on duty Don of the output transistor N1 can be rapidly increased to a required level, and a decrease of the analog power supply voltage AVDD can be effectively suppressed. Thus, it is possible to perform the display operation of the liquid crystal display panel 20 without hindrance.

Switching Power Supply Circuit (Second Embodiment)

Figure 6:
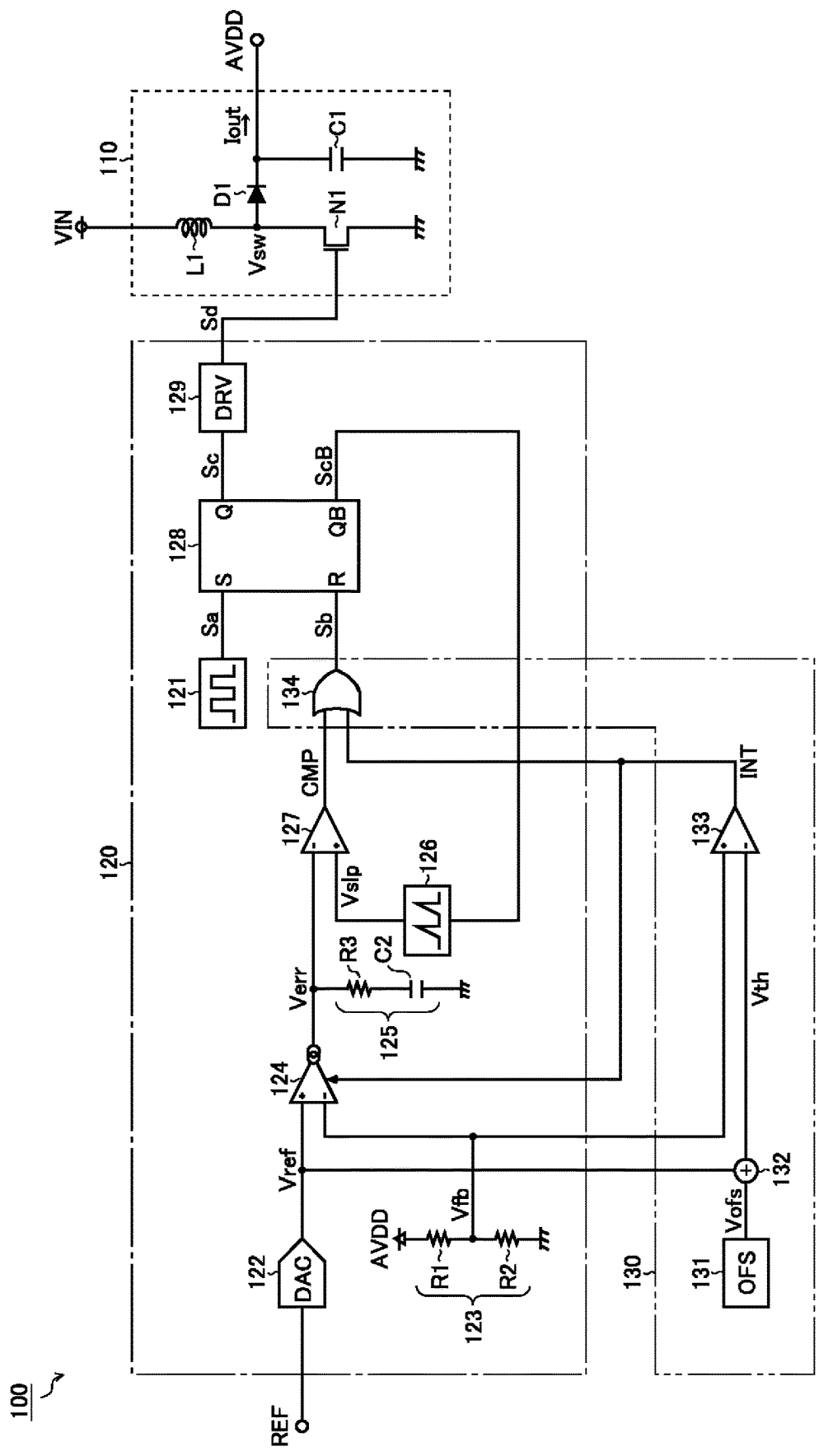
FIG. 6 is a circuit diagram illustrating a second embodiment of the switching power supply circuit.

FIG. 6 is a circuit diagram illustrating a second embodiment of the switching power supply circuit. The switching power supply circuit 100 of this embodiment has a feature in that it further performs gain control of the error amplifier 124 using the interrupt signal INT on the basis of the first embodiment (FIG. 2). Accordingly, the same structural element as in the first embodiment is denoted by the same numeral as in FIG. 2 so that overlapping description is omitted, and characterizing portions of this embodiment are mainly described below.

In the switching power supply circuit 100 of this embodiment, the interrupt signal INT is input not only to the OR gate 134 but also to the error amplifier 124. The error amplifier 124 has a function of decreasing its gain (i.e., its trans conductance gm) from a normal value when the interrupt signal INT is at the high level.

In other words, the interrupt unit 130 operates to decrease a gain of the error amplifier 124 from its normal value during a period while the feedback voltage Vfb is higher than the threshold value voltage Vth, in response to a periodic load change. The technical meaning thereof is described below.

Load Response Behavior (Second Embodiment)

Figure 7:
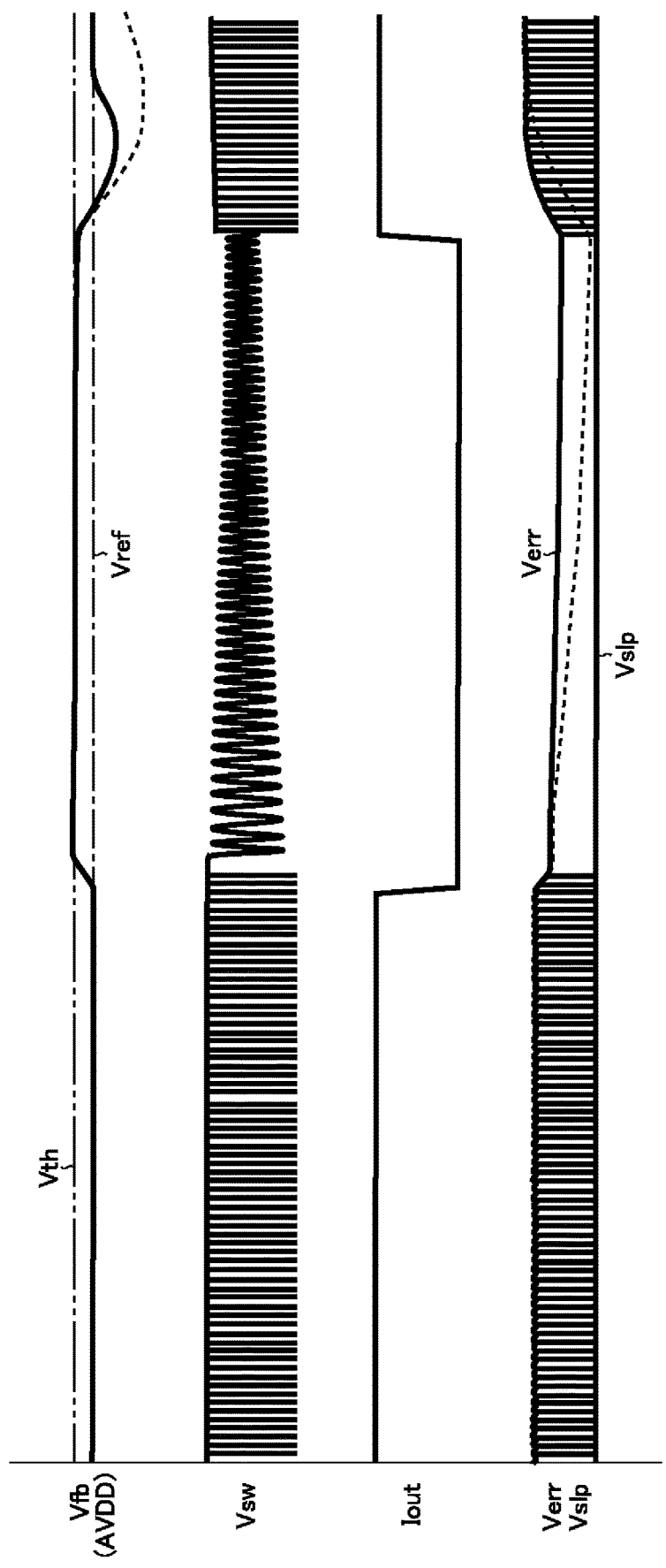
FIG. 7 is a timing chart illustrating an example of the load response behavior in the second embodiment.

FIG. 7 is a timing chart illustrating an example of the load response behavior in the second embodiment, and shows the feedback voltage Vfb (therefore the analog power supply voltage AVDD), the switch voltage Vsw, the output current Iout, and the error voltage Verr and the slope voltage Vslp, in order from top to bottom.

Further, as to the feedback voltage Vfb and the error voltage Verr, solid lines indicate behaviors when the gain decreasing function of the error amplifier 124 is introduced (the load response behavior in the second embodiment), while broken lines indicate behaviors when the gain decreasing function of the error amplifier 124 is not introduced (the load response behavior in the first embodiment) for comparison.

When the interrupt unit 130 is introduced, the output transistor N1 is forcibly turned off in the state where the feedback voltage Vfb is slightly higher than the reference voltage Vref, in the non-display period of the liquid crystal display panel 20, and hence the error amplifier 124 continues to discharge the capacitor C2. Accordingly, as the non-display period of the liquid crystal display panel 20 becomes longer, the error voltage Verr is gradually decreased from the balanced value, and hence the effect of improving the load responsiveness is diluted.

On the other hand, in the switching power supply circuit 100 of the second embodiment, the gain of the error amplifier 124 is decreased from the normal value when the interrupt signal INT is at the high level, and hence the decreasing speed of the error voltage Verr in the non-display period of the liquid crystal display panel 20 can be gradually suppressed. Accordingly, compared with the first embodiment in which the gain of the error amplifier 124 is fixed, the load responsiveness can be further improved.

Further, in view of the fact that the improvement effect of the load responsiveness by decreasing the gain of the error amplifier 124 becomes larger as the non-operation period of the liquid crystal display panel 20 is longer, the non-operation period of the liquid crystal display panel 20 is shown a little longer in FIG. 7 than in FIG. 5. Of course it goes without saying that the load responsiveness can be improved by decreasing the gain of the error amplifier 124 even if the non-operation period of the liquid crystal display panel 20 is short.

Switching Power Supply Circuit (Third Embodiment)

Figure 8:
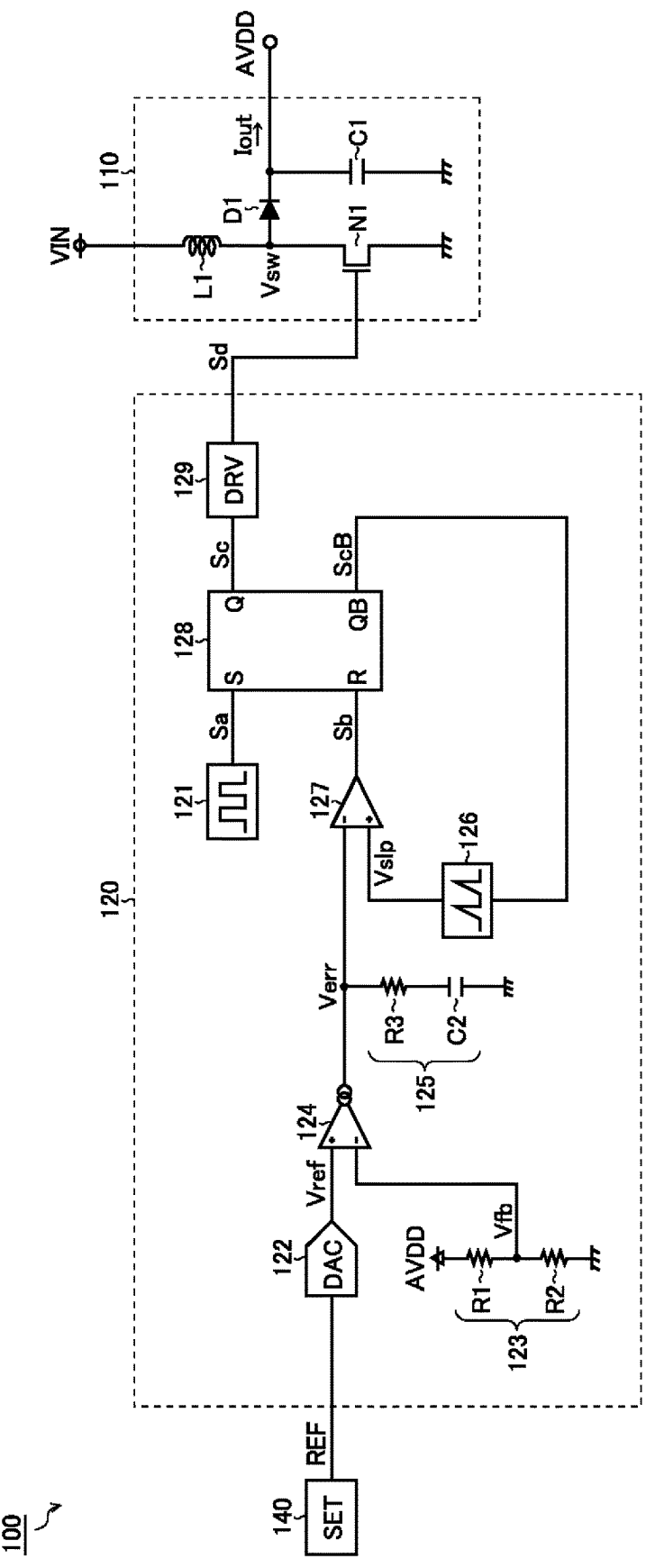
FIG. 8 is a circuit diagram illustrating a third embodiment of the switching power supply circuit.

FIG. 8 is a circuit diagram illustrating a third embodiment of the switching power supply circuit. The switching power supply circuit 100 of this embodiment has a feature in that the interrupt unit 130 is eliminated from the first embodiment (FIG. 2) or the second embodiment (FIG. 6), and that the reference voltage setting unit 140 is included. Accordingly, the same structural element as in the first embodiment or the second embodiment is denoted by the same numeral as in FIG. 2 or FIG. 6 so that overlapping description is omitted, and characterizing portions of this embodiment are mainly described below.

The comparator 127 directly outputs the comparison signal as the reset signal Sb to the RS flip-flop 128 because the interrupt unit 130 is eliminated.

The reference voltage setting unit 140 generates the reference voltage setting signal REF and outputs the same to the switching control unit 120 (more specifically the digital-to-analog conversion unit 122). Further, the reference voltage setting unit 140 includes a function of temporarily changing reference voltage Vref (i.e., a function of temporarily changing a data value of the reference voltage setting signal REF) in synchronization with timing of a periodic load change. This function will be described later in detail.

<Reference Voltage Setting Unit>

Figure 9:
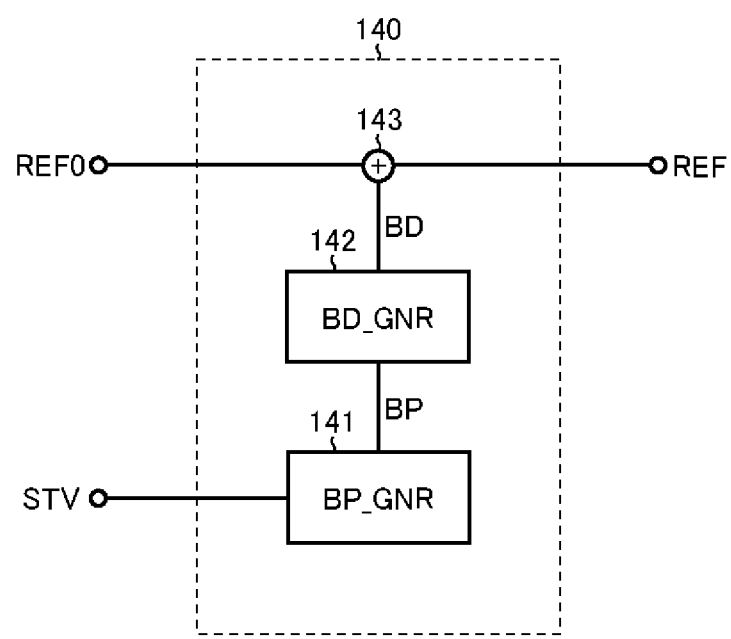
FIG. 9 is a block diagram illustrating a structural example of a reference voltage setting unit.

FIG. 9 is a block diagram illustrating a structural example of the reference voltage setting unit 140. The reference voltage setting unit 140 of this structural example includes a boost pulse signal generating unit 141, a boost data signal generating unit 142, and an adder unit 143.

The boost pulse signal generating unit 141 monitors a strobe signal STV (i.e., a vertical synchronization start signal for informing the gate driver 14 of a frame head timing), so as to switch a logical level of a boost pulse signal BP in synchronization with timing of a periodic load change.

More specifically, the boost pulse signal generating unit 141 raises the boost pulse signal BP from the low level to the high level before the output current Iout starts to increase after the blanking period of the liquid crystal display panel 20 has finished. After that, the boost pulse signal generating unit 141 drops the boost pulse signal BP from the high level to the low level at the timing when a predetermined boost period Tbst has elapsed.

Further, the strobe signal STV is a logic signal that becomes the high level in the display period of the liquid crystal display panel 20 and becomes the low level in the non-display period of the liquid crystal display panel 20. Accordingly, in the boost pulse signal generating unit 141, the periodic load change timing (i.e., output current Iout increasing timing) can be sensed by monitoring the rising edge of the strobe signal STV. However, without limiting to the strobe signal STV, the boost pulse signal generating unit 141 may monitor any signal as long as it can sense the periodic load change timing.

The boost data signal generating unit 142 switches a data value of the boost data signal BD in response to a logical level of the boost pulse signal BP. More specifically, the boost data signal generating unit 142 sets the boost data signal BD to a predetermined boost value Dbst if the boost pulse signal BP is at the high level, while it resets the boost data signal BD to zero if the boost pulse signal BP is at the low level. Note that it is preferred to set the boost value Dbst to approximately 1% of an external reference voltage setting signal REF0 (i.e., to REF0×0.01).

The adder unit 143 adds the boost data signal BD to the external reference voltage setting signal REF0 input from outside of the circuit so as to generate the reference voltage setting signal REF. Accordingly, a data value of the reference voltage setting signal REF becomes REF0+Dbst if the boost pulse signal BP is at the high level, while it becomes REF0 if the boost pulse signal BP is at the low level.

Further, it is possible to configure to multiply the external reference voltage setting signal REF0 by a predetermined boost coefficient α (e.g., 1.01) so as to generate the reference voltage setting signal REF, instead of adding the boost data signal BD to the external reference voltage setting signal REF0 so as to generate the reference voltage setting signal REF.

<Boost Operation>

Figure 10:
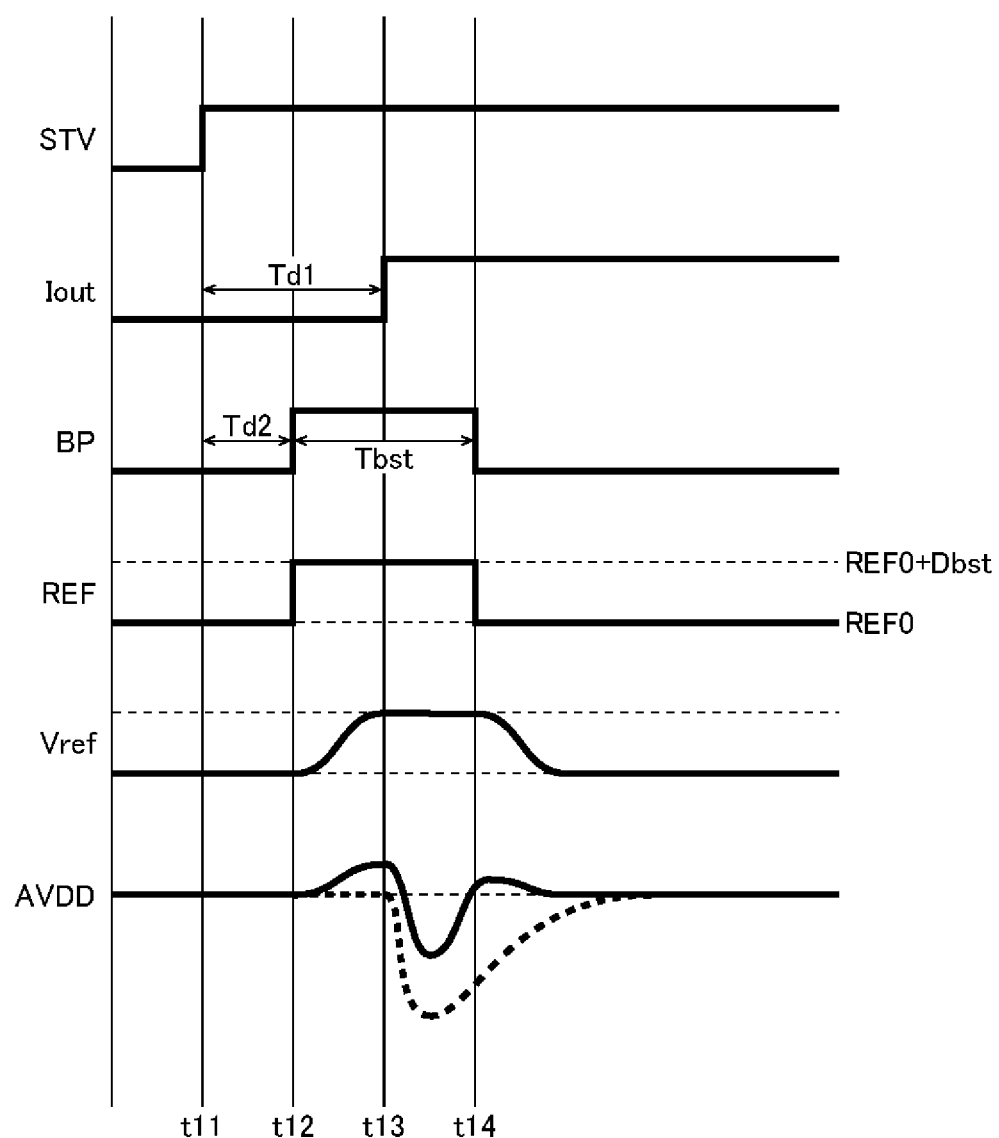
FIG. 10 is a timing chart illustrating a first example of a boost operation.

FIG. 10 is a timing chart illustrating a first example of the boost operation performed by the reference voltage setting unit 140, and shows the strobe signal STV, the output current Iout, the boost pulse signal BP, the reference voltage setting signal REF, the reference voltage Vref, and the analog power supply voltage AVDD, in order from top to bottom.

Further, as to the analog power supply voltage AVDD, a solid line indicates a behavior when the reference voltage setting unit 140 is mounted (the load response behavior in this structural example), while a broken line indicates a behavior when the reference voltage setting unit 140 is not mounted (the conventional load response behavior) for comparison.

As described above, as to the source driver 15 and the gamma voltage generating unit 16 that are loads on the switching power supply circuit 100, consumption currents thereof are periodically changed because the liquid crystal display panel 20 alternately repeats display periods and non-display periods (so-called blanking periods).

In other words, the output current Iout of the switching power supply circuit 100 periodically changes in response to a driving state of the liquid crystal display panel 20. Specifically, a predetermined output current Iout flows in the display period of the liquid crystal display panel 20 (a heavy load state). On the other hand, the output current Iout does not substantially flow in the non-display period of the liquid crystal display panel 20 (a light load state).

In the example of this diagram, an increase of the output current Iout occurs at a time point t13 when a predetermined first delay time Td1 has elapsed after the strobe signal STV is raised to the high level at a time point t11.

It is supposed that the reference voltage setting unit 140 is not mounted and that the reference voltage Vref has a fixed value. Then, the on duty Don of the output transistor N1 is increased for the first time when the analog power supply voltage AVDD becomes lower than the set value along with an increase of the output current Iout. Accordingly, the analog power supply voltage AVDD is decreased largely from the set value due to delay of increase of the on duty Don, and hence the display operation of the liquid crystal display panel 20 may be disturbed.

On the other hand, if the reference voltage setting unit 140 is mounted, the boost pulse signal BP is raised to the high level so that the reference voltage Vref is temporarily increased before the output current Iout increases.

Further, if there is a delay period of microsecond order after the strobe signal STV is raised to the high level until the output current Iout increases (i.e., the first delay period Td1), the rising timing of the boost pulse signal BP in the current period can be set on the basis of a rising edge of the strobe signal STV in the current period.

More specifically, the boost pulse signal BP is raised from the low level to the high level at a time point t12 when a predetermined second delay time Td2 (Td2<Td1) has elapsed from the time point t11, and then is dropped from the high level to the low level at a time point t14 when the predetermined boost period Tbst has elapsed. Note that the boost period Tbst is set to an appropriate length in consideration of a response time of the switching control unit 120.

In the boost period Tbst set to include the time point t13, a data value of the reference voltage setting signal REF is increased from REF0 to REF0+Dbst. In other words, because the reference voltage Vref is temporarily increased, the on duty Don of the output transistor N1 is increased, and hence the analog power supply voltage AVDD is increased to a voltage value higher than the original set value.

In this way, because the analog power supply voltage AVDD is increased in advance before a load change occurs, a decrease of the analog power supply voltage AVDD due to the load change can be canceled. Accordingly, a decrease of the analog power supply voltage AVDD can be effectively suppressed, and the display operation of the liquid crystal display panel 20 can be performed without hindrance.

In addition, it is also advantageous to the response speed that the on duty Don of the output transistor N1 is increased so that the analog power supply voltage AVDD is intentionally increased from the original set value, instead of starting to increase the on duty Don of the output transistor N1 for the first time when the analog power supply voltage AVDD becomes lower than the set value.

Figure 11:
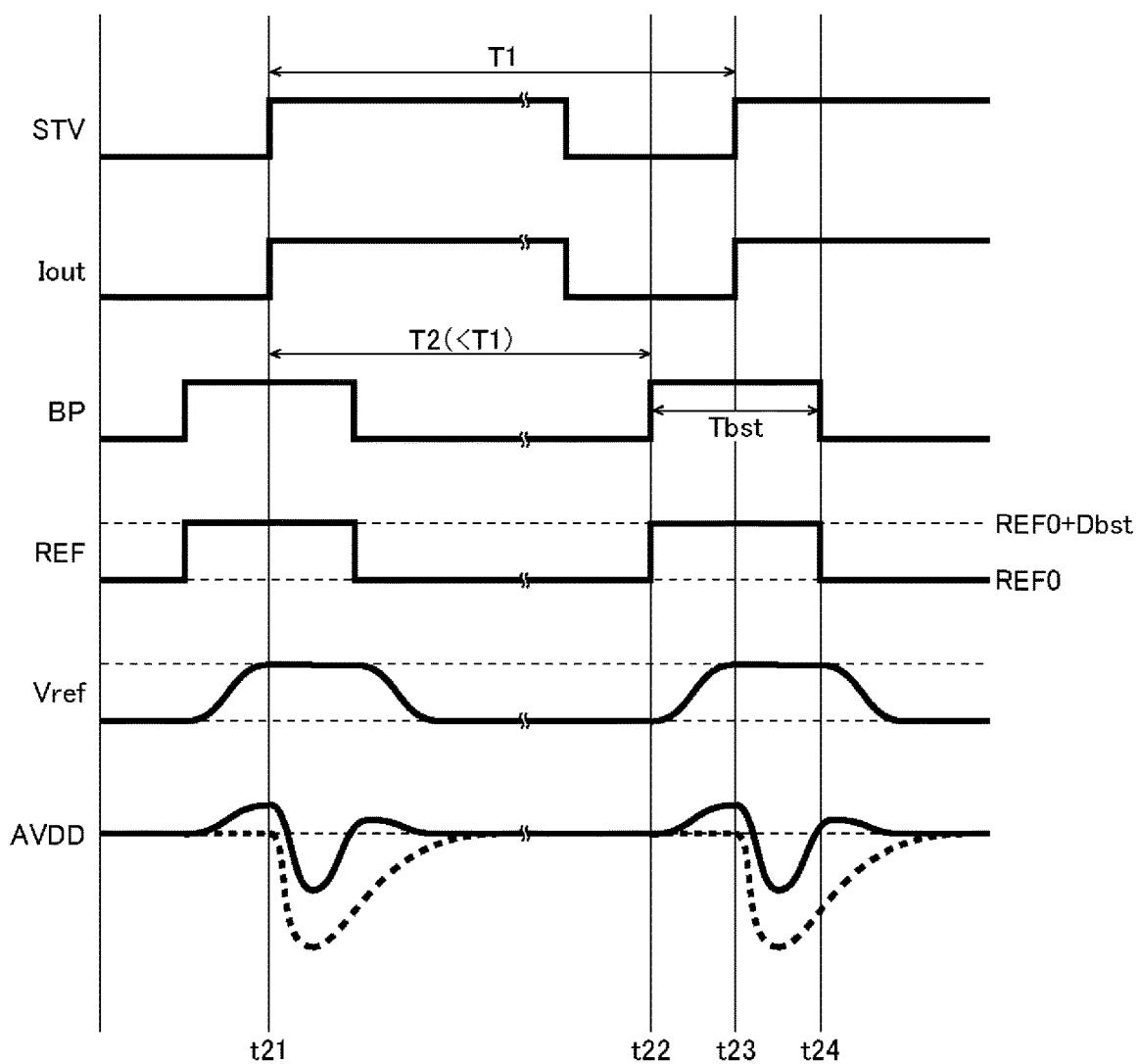
FIG. 11 is a timing chart illustrating a second example of the boost operation.

FIG. 11 is a timing chart illustrating a second example of the boost operation performed by the reference voltage setting unit 140, and shows the strobe signal STV, the output current Iout, the boost pulse signal BP, the reference voltage setting signal REF, the reference voltage Vref, and the analog power supply voltage AVDD, in order from top to bottom.

In the example of this diagram, the strobe signal STV is raised to the high level at a time point t21, and substantially at the same time, an increase of the output current Iout occurs. In this way, if there is substantially no delay period after the strobe signal STV is raised to the high level until the output current Iout increases, a rising timing of the boost pulse signal BP in the current period cannot be set on the basis of a rising edge of the strobe signal STV in the current period.

In this case, in consideration that the pulse period T1 of the strobe signal STV is always constant, changing timing of the reference voltage Vref in the current period should be determined from load change timing in the previous period.

For instance, if the strobe signal STV is raised to the high level at the time point t21, the strobe signal STV is raised again to the high level at a time point t23 when the pulse period T1 has elapsed from the time point t21, and substantially at the same time, an increase of the output current Iout is predicted to occur.

Accordingly, the boost pulse signal BP is raised from the low level to the high level at a time point t22 when a predetermined interval time T2 (T2<T1) has elapsed from the time point t21, and then is dropped from the high level to the low level at a time point t24 when the predetermined boost period Tbst has elapsed. Note that the boost period Tbst is set to an appropriate length in consideration of a response time of the switching control unit 120.

In the boost period Tbst set to include the time point t23, a data value of the reference voltage setting signal REF is increased from REF0 to REF0+Dbst. In other words, because the reference voltage Vref is temporarily increased, the on duty Don of the output transistor N1 is increased, and hence the analog power supply voltage AVDD is increased to a voltage value higher than the original set value.

In this way, because the analog power supply voltage AVDD is increased in advance before a load change occurs, a decrease of the analog power supply voltage AVDD due to the load change can be canceled. Accordingly, a decrease of the analog power supply voltage AVDD can be effectively suppressed, and the display operation of the liquid crystal display panel 20 can be performed without hindrance. This is the same as the first operation example described above.

<Application to TV Set>

Figure 12:
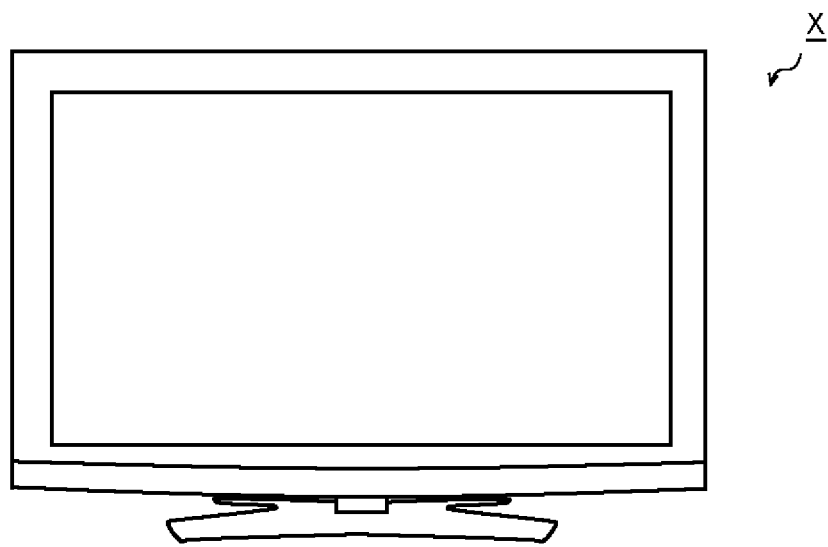
FIG. 12 is an outside view of a TV set.

FIG. 12 is an outside view of a TV set. A TV set X is an example of the liquid crystal display device 1, in which the switching power supply circuit 100 described above can be appropriately used as the power supply means.

<Other Variations>

Further, in the above description, there is described the example in which the switching power supply circuit 100 is mounted in the liquid crystal display device 1 (or the liquid crystal driving device 10), but the switching power supply circuit 100 can be widely used as power supply means in applications in which a periodic load change occurs.

In addition, an output type of the switching output unit 110 is not limited to the step-up type but can be appropriately modified to a step-down type or a step-up/down type.

In addition, as to a rectifying type of the switching output unit 110, it is possible to adopt a synchronous rectifying type instead of the diode rectifying type. In particular, in a synchronous rectifying type switching power supply circuit having a light load reverse current cut-off function, a high responsiveness to a periodic load change can be obtained by introducing the interrupt function described above (the forcible turn-off function of the output transistor or the gain decreasing function of the error amplifier).

In this way, various technical features disclosed in this specification, other than the embodiment described above, can be variously modified within the scope of the technical invention without deviating from the spirit thereof. In other words, the embodiment described above is merely an example in every aspect and should not be interpreted as limiting the scope of the present invention. The technical scope of the present invention is defined not by the above description of the embodiment but by the claims, which should be interpreted to include every modification within the claims and equivalent meanings and scope thereof.

INDUSTRIAL APPLICABILITY

The invention disclosed in this specification can be used for improving load responsiveness of a switching power supply circuit.

What is claimed is:

1. A switching power supply circuit, comprising:
a switching output unit coupled between an input terminal of an input voltage and an output terminal of an output voltage and arranged to generate the output voltage from the input voltage using an output transistor;
a switching control unit coupled to the output transistor and arranged to control on and off of the output transistor so that the output voltage or a feedback voltage in proportion to the output voltage agrees with a predetermined reference voltage; and
an interrupt unit coupled to the switching control unit and arranged to generate an interrupt signal and forcibly turn off the output transistor by using the interrupt signal during a period while the output voltage or the feedback voltage deviates from the reference voltage and remains higher than a threshold value voltage that is higher than the reference voltage as a result of the switching control unit failing to respond in time to a periodic load change,
wherein the switching control unit includes:
an error amplifier arranged to generate an error voltage in response to a differential value between the output voltage or the feedback voltage and the reference voltage;
a first comparator arranged to compare the error voltage with a slope voltage so as to generate a comparison signal; and
an RS flip-flop arranged to generate a pulse width modulation signal for determining an on duty of the output transistor in response to a set signal and a reset signal,
wherein the interrupt unit includes: a second comparator arranged to compare the feedback voltage with the threshold value voltage so as to generate the interrupt signal, and
a logic gate arranged to perform a logical operation between the comparison signal and the interrupt signal so as to output a result of the logical operation as the reset signal for the RS flip-flop, and
wherein the interrupt unit is operable to decrease a gain of the error amplifier from a normal value by using the interrupt signal during a period while the output voltage or the feedback voltage is higher than the threshold value voltage in response to a periodic load change.

2. The switching power supply circuit according to claim 1, wherein the threshold value voltage is set at a voltage value higher than the reference voltage on the basis of the reference voltage.

3. The switching power supply circuit according to claim 1, wherein the switching control unit further includes:
a clock signal generating unit arranged to generate the set signal of a predetermined frequency,
a slope voltage generating unit arranged to generate a slope voltage in synchronization with on/off control of the output transistor, and
a driver arranged to receive an input of the pulse width modulation signal so as to output an on/off control signal of the output transistor.

4. The switching power supply circuit according to claim 1, wherein the switching control unit further includes a phase compensator connected to an output terminal of the error amplifier so as to perform phase compensation of the error voltage.

5. The switching power supply circuit according to claim 1, wherein the switching control unit includes a digital-to-analog conversion unit arranged to generate the analog reference voltage from a digital reference voltage setting signal.

6. A liquid crystal display device comprising:
a liquid crystal driving device comprising the switching power supply circuit according to claim 1; and
a liquid crystal display panel driven by the liquid crystal driving device.

* * * * *